United States Patent [19]

Fassell et al.

[11] 3,920,548

[45] Nov. 18, 1975

[54] WET OXIDATION PROCESS FOR WASTE MATERIAL

[75] Inventors: W. Martin Fassell, Newport Beach; Donald W. Bridges, Irvine, both of Calif.

[73] Assignee: Barber-Colman Company, Rockford, Ill.

[22] Filed: Mar. 29, 1973

[21] Appl. No.: 346,152

[30] Foreign Application Priority Data
Sept. 29, 1972 Germany.......................... 22478417

[52] U.S. Cl. ...................... 210/63; 210/10; 210/71
[51] Int. Cl............................ C02c 5/04; C02c 3/00
[58] Field of Search .......... 209/182; 210/10, 63, 67, 210/71; 162/31

[56] References Cited
UNITED STATES PATENTS

| | | | |
|---|---|---|---|
| 3,649,534 | 3/1972 | Schotte................................. | 210/63 |
| 3,661,778 | 5/1972 | Pradt..................................... | 210/63 |

OTHER PUBLICATIONS

Proposed Process for the Treatment of Organic Waste Material using a High-pressure Wet-Oxidation Process, 10/27/70, Philco–Ford.
The Wetox Wet Oxidation Process and Mobile Pilot Plant, Barber–Colman Co., 3/15/72.
Pure and Applied Chemistry, Vol. 5, 1962, pp. 683–699, Fassell, Jr.
Proposal for Design, Development, Construction and Test of an Operational Prototype 10–20 Man Waste Treatment System, 3/3/71, Philco–Ford.
Technical Note, Summary of the Technology of Wet Oxidation, 4/3/72, Barber–Colman Co.
Investigation of the Feasibility of Wet Oxidation for Spacecraft Waste Treatment, Wheaton et al., 10/27/67.

Primary Examiner—Charles N. Hart
Assistant Examiner—Robert H. Spitzer

[57] ABSTRACT

In the wet oxidation of waste materials with an oxidizing gas, the process is carried out in a horizontally-elongated reactor vessel divided into generally cylindrical, interconnecting, compartments. An aqueous dispersion of the wastes is continuously introduced into a compartment at one end of the reactor vessel, and flows from compartment to compartment while an oxidizing gas is continuously introduced into each compartment. The dispersion is vigorously agitated to disperse the oxidizing gas, and thereby effect oxidation of the waste materials to produce an ecologically acceptable effluent. The average temperature of the dispersion is maintained at a low level, and the pH is held in the acid range.

6 Claims, 5 Drawing Figures

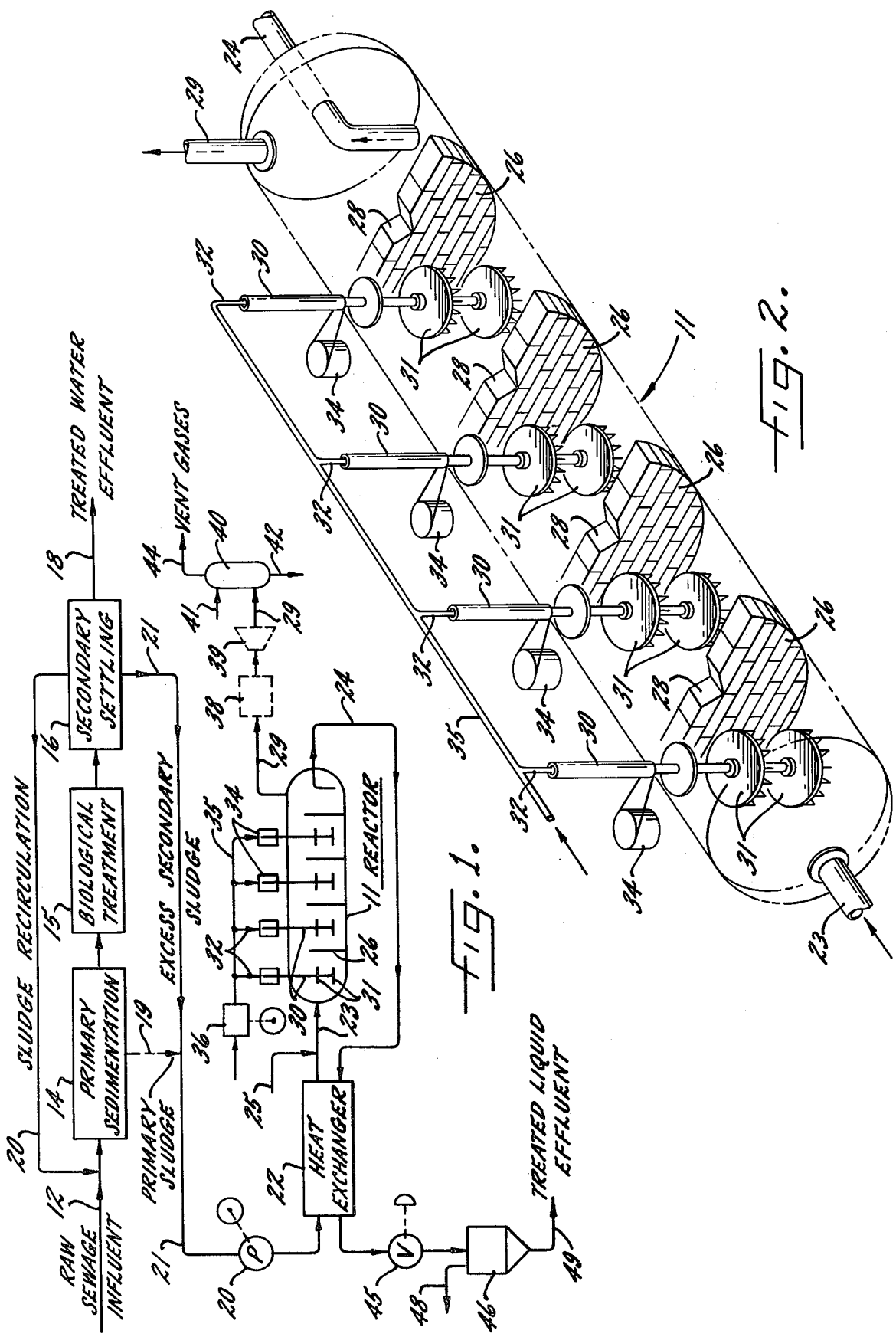

WET OXIDATION PROCESS FOR WASTE MATERIAL

BACKGROUND OF THE INVENTION

This invention relates to the flameless, or wet, oxidation of carbonaceous waste materials with an oxygen-containing gas to produce an ecologically acceptable effluent. More particularly, it concerns a process for the wet oxidation of waste materials such as municipal sewage sludge, with particular equipment and under specified conditions, to increase the efficiency of the oxidation and reduce the cost of equipment and operation associated with preexisting wet oxidation techniques.

In the treatment of sewage, particularly municipal sewage, disposal of the resulting sludge is probably the major unsolved problem in sanitation engineering. Conventional waste water treatment includes a series of physical and biochemical unit operations in which organic waste is separated as a sludge. A typical community of 200,000 generates 20 tons of sludge daily. Sludge contains about 95–99% water; disposal is costly, burial is unsafe without sterilization, utilization is limited, and it is a poor fertilizer or fuel.

Over the past 30 or 40 years many proposals have been advanced for the treatment and disposition of sewage sludge. One of the earliest, the Porteous process of 1935 (U.S. Pat. No. 2,075,224), entails heating of the sludge in a pressurized vessel to 360°–392°F. for 15–30 minutes under autogeneous pressure. This sterilizes the sludge and improves its settleability and filterability, but "produces an odorous, colored, polluting liquor" that cannot be released to the environment. (Brooks, "Heat Treatment of Activated Sludge", *Water Pollution Control* 1968, pp. 592–601).

Since about 1912 (Strehlenert U.S. Pat. No. 1,149,420), much interest has centered on the so-called wet oxidation or submerged combustion processes. As later developed by Zimmermann (U.S. Pat. No. 2,655,249) and others, an aqueous dispersion of organic waste materials is contacted with an oxidizing gas at sufficient time, temperature, and pressure to cause a submerged, flameless oxidation of the wastes. Insoluble carbonaceous organic matter is converted to simpler soluble organic compounds, which are in turn oxidized and eventually converted to carbon dioxide and water. Organic amine nitrogen is ultimately converted to ammonia, sulfur compounds to sulfates, and phosphorus compounds to insoluble phosphates. All pathogenic organisms, including schizomycetics, viruses and pores, are destroyed.

As originally proposed (U.S. Pat. No. 2,655,249), the Zimmermann or "Zimpro" process was carried out, either batchwise or continuously, in a vertical reactor vessel operated well above 450°F., and usually at about 500°–600°F. The reactors were pressured with air; the pressures at reaction temperatures were commonly in the range of 1500–2,000 psi. In subsequent units, operating temperatures were reduced to 435°–530°F., with corresponding pressures of about 485–1750 psi. (Teletzke, "Wet Air Oxidation", *Chemical Engineering Progress*, Vol. 60 No. 1 (January 1964, pp. 33–38).) While there are undoubtedly economic advantages in operating at these lower temperatures and pressures, it has been reported that the quality of the effluent liquor from low temperature wet oxidation is no better than that from Porteous heat treatment without oxidation. (Brooks, "Heat Treatment of Sewage Sludge", *Water Pollution Control*, 1970, pp. 92–99; id., 1968, pp. 592–601; Water Pollution Research Steering Committee, *Water Pollution Research* 1969, H. M. Stationary Office (London) 1970, 191 pp.)

More recently, extensive studies have been carried out on the application of wet oxidation to digestion of raw sewage (e.g. Wheaton et al., "Investigation of the Feasibility of Wet Oxidation for Spacecraft Waste Treatment", N.A.S.A. Contractor Report No. 66450, Aug. 30, 1967; Jagow, "The Processing of Human Wastes by Wet Oxidation for Manned Spacecraft", A.S.M.E. Space Technology and Heat Transfer Conference, Los Angeles, Cal. June 21–24, 1970). Thus, at least on a small scale, wet oxidation is theoretically and practically capable of producing an ecologically acceptable effluent—or at least one which need not be recycled to the sewage treatment plant.

Accordingly, an object of the present invention is to provide a wet oxidation process for sewage sludge and other carbonaceous waste materials which operates at relatively low temperatures and pressure, but which is capable of producing a high quality effluent. Another object is to provide a wet oxidation process for treating sludge from large municipal sewage treatment plants, which process features low equipment investment and low operating costs. Still another object is to provide a wet oxidation process, and equipment therefor, in which the oxidation efficiency and rate (and consequently the permissible plant throughput rate) are maximized. A further object is to provide such process which is useful and effective for a variety of wastes and for a variety of requirements.

Other and further objects, aims, and advantages of the invention will be described as the description thereof proceeds.

SUMMARY OF THE INVENTION

Briefly, and in accordance with the invention, the wet oxidation of carbonaceous waste materials with an oxidizing gas is effected in a horizontally-elongated reactor vessel divided into a plurality of generally cylindrical, interconnecting compartments. An aqueous dispersion of sewage sludge or other waste materials is continuously introduced near one end of the vessel, flows from compartment to compartment through the vessel, and is withdrawn from near the opposite end. Oxidizing gas is continuously introduced into the dispersion in a plurality of the compartments, while agitators vigorously agitate the dispersion in those compartments to disperse the oxidizing gas and thereby effect oxidation of the waste materials to produce an ecologically acceptable effluent.

While flowing through the reactor vessel, the dispersion is advantageously maintained at an average temperature of about 420°–480°F., and its pH is desirably maintained in the acid range, e.g. pH of 1.5–7.0.

As a result of the foregoing, extremely rapid reaction (oxidation) rates are achieved at times, temperatures, and pressures heretofore regarded as being inadequate for substantially complete wet oxidation of sewage sludge. As concomitant benefits, equipment and operating costs are held at a level sufficiently low to make wet oxidation attractive for small size (e.g. shipboard) as well as large scale (e.g. municipal treatment) applications.

Other features, aims, objectives, and advantages of the invention are set forth below.

BRIEF DESCRIPTION OF THE DRAWINGS

Other advantages of the invention will become apparent from the ensuing description, read in conjunction with the appended drawings, wherein:

FIG. 1 is a schematic flowsheet of a wet oxidation process for the treatment of sewage sludge obtained from a municipal, agricultural, or industrial biological treatment process;

FIG. 2 is a schematic perspective of an illustrative reactor vessel for use in the process of FIG. 1;

DETAILED DESCRIPTION OF THE INVENTION

A. Illustrative Flowsheet — General

Figure 3:
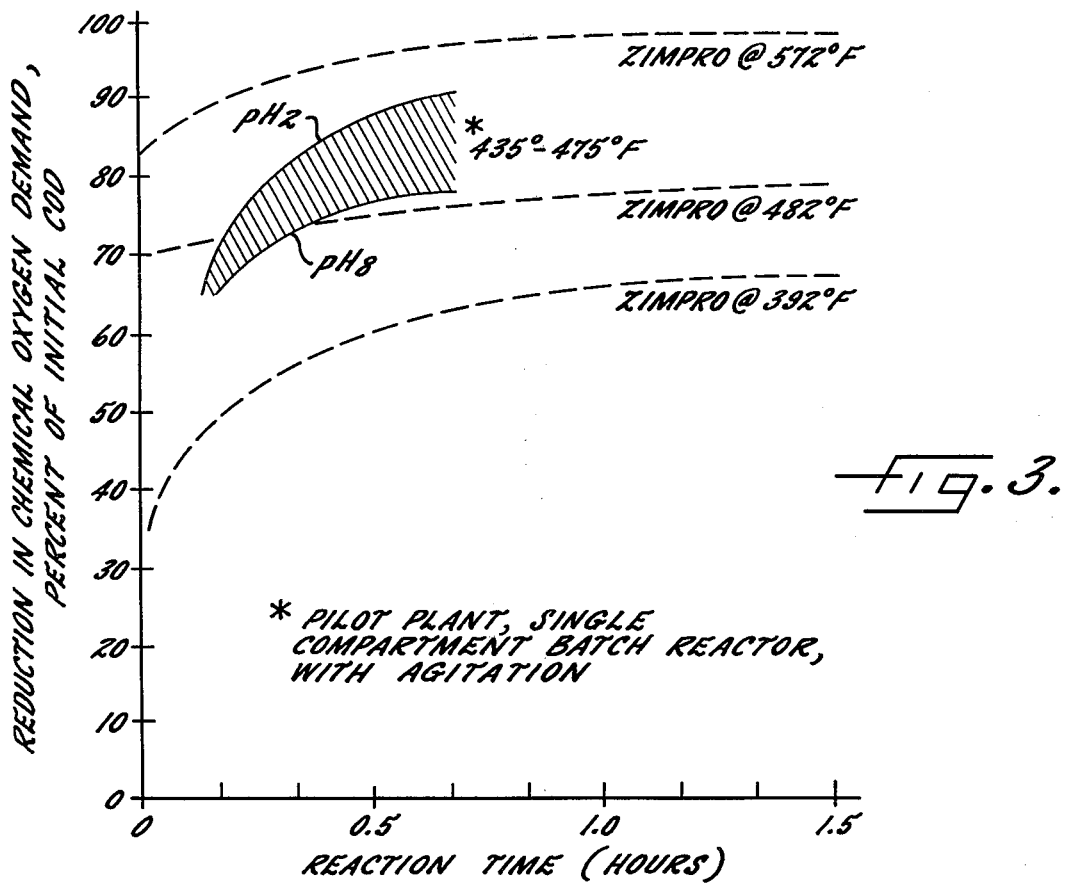
FIG. 3 is a graph containing representative data demonstrating the effect of vigorous agitation on the wet oxidation of sewage sludge, using single stage vertical reactors.

An illustrative embodiment of the invention is depicted in FIG. 1, in which a horizontally elongated reactor vessel 11, compartmented into a series of generally cylindrical interconnecting compartments, is employed for the wet oxidation of excess secondary sludge from a municipal sewage treatment plant.

The sewage treatment plant itself is indicated only schematically, by reason of the diversity of treatment processes in common use. As shown in FIG. 1, the main stream of a raw sewage influent is supplied via a conduit 12 to a primary sedimentation facility 14, thence to a biological, or secondary, treatment facility 15, and finally to a secondary settling tank 16, where treated water effluent is withdrawn through a conduit 18 and is suitable for discharge to interior lakes, rivers, etc.

The raw sewage influent of conduit 12 has a composition largely dependent on the relative amount of industrial and storm sewer wastes mixed with municipal and/or agricultural sewage. Sewage is usually about 99.95% water. It typically contains from about 400 to greater than 1200 ppm total solids (150–850 ppm volatile, 100–500 ppm suspended), about 5–75 ppm ether-soluble matter, about 25–30 ppm total nitrogen, and about 20–80 ppm chlorides. Its biochemical oxygen demand (BOD) may range from about 100 or less to about 400 or more.

The raw sewage is initially given a primary treatment, shown schematically in FIG. 1 as a primary sedimentation unit 14, consisting of a physical separation such as screening or sedimentation to remove particles above colloidal size; it also usually removes some 30–60% of the BOD. Usually, coarse screens or racks are used to catch large floating objects. Some plants additionally employ medium screens (0.5 to 1.5 inch openings) and/or fine screens (1/16 to 1/8 inch). Screened solids are generally dried and incinerated, although many plants use comminutors to shred the debris, which then passes on with the liquid into the treatment plant.

Optional, additional, or alternative preliminary treatment may include grit, or settling, chambers to remove heavier inorganic particles, and skimming or vacuum tanks for grease and oil flotation and removal.

The bulk of the sewage stream then proceeds through the primary sedimentation facility 14. These are large bowl-shaped pools provided with slow-moving rake-like arms, which permit solids to settle out and be raked toward a center sump for collection and disposition. In some plants flocculating agents such as ferric chloride or alum are added to form an adherent floc to assist in sedimentation.

The solid effluent from primary sedimentation, usually termed primary sludge, is withdrawn from the primary sedimentation facility 14 and is transferred via a symbolic conduit to a holding tank (not shown) for collection and ultimate oxidation.

The liquid effluent from primary sedimentation is a colloidal, or near-colloidal, suspension of solids which defies sedimentation. This suspension is then transferred to a biological treatment facility 15 for biological treatment, usually aerobic oxidation and fermentation.

The main processes utilized for biological secondary treatment of waste water are the trickling filter and the activated sludge process. See Kirk-Othmer, *Encyclopedia of Chemical Technology*, Second Edition, Vol. 22, pp. 104–115. In any of the various biological treatment processes, a microbial sludge is formed which assists in the further oxidation of organic waste material in an oxygen-containing environment. Colloidal solids and grease coagulate on the sludge. The percentage removal of suspended solids and BOD by biological treatment is typically as high as 90 or 95%.

From the biological treatment facility 15 the effluent is conducted to a secondary settling tank similar to the primary sedimentation facility 14. There the stream is detained for about two hours, to permit the so-called secondary or activated sewage sludge to settle out. A portion is recirculated via the conduit 20 to primary sedimentation, while excess activated sludge is collected via a conduit 21 for wet oxidation.

Activated sludge usually contains 99 to 99.5% water, but may contain more under extreme bulking conditions. The sludge index, or volume in milliliters occupied by one gram of sludge after 30 minutes of settling, is typically around 100. Generally, bulking can be countered by increasing the temperature, adding lime to obtain a pH of 8 or more, or heavily chlorinating the mixture to kill organisms responsible for bulking.

Treated effluent from the secondary settling facility, discharged via a treated water effluent conduit 18, generally has a BOD of 20 ppm or less and is acceptable for discharge into rivers, streams, lakes, or the like. It is not, however, potable and usually is further treated, depending upon the nature of the water system into which it is discharged.

Treatment of the water effluent is most often effected by adding chlorine or a similar chlorine-affording chemical to destroy residual bacteria, control odor, reduce BOD and chemical oxygen demand (COD), etc. A residual chlorine level of 0.5 ppm in all discharged effluents is required by the laws of most states.

A tertiary treatment (not shown) may be employed to accomplish additional effluent purification. Activated carbon, the use of ion exchange resins, and like polishing steps are occasionally used (see Kirk-Othmer, above, pp. 116–124).

B. PRETREATMENT OF SEWAGE SLUDGE

Sewage sludge collected from a sewage treatment plant of the generaly type outlined above presents a serious disposal problem, the solution of which is facilitated according to the present invention. As noted earlier, the excess secondary sludge from conduit 21, and optionally the primary sludge from conduit 19, are predominantly water, with usually a percent or less of carbonaceous waste material forming a thickened but pumpable suspension or slurry.

The sludge, prior to oxidation, may in some cases be subjected to anaerobic fermentation at around 90°–95°F. to convert about 40% of the sludge solids to liquids and gases. After about 30–60 days, the remaining digested sludge is chemically stable and essentially odorless. Off-gases are typically collected; these are composed predominantly of methane, and serve to provide a low-grade fuel gas for in-plant heating.

C. SLUDGE OXIDATION — APPARATUS

Excess secondary sludge and optional primary sludge are, in accordance with the invention, oxidized at elevated temperature and pressure with an oxygen-containing gas in a reactor vessel 11 which is depicted schematically in FIG. 1 and, in more detail, in FIG. 2.

Design and construction of the reactor 11 advantageously follows principles successfully applied to high pressure extractive metallurgical reactors. (See Fassell, "Hyper-Atmospheric Extractive Metallurgy, Its Past, Present and Future", *Pure and Applied Chemistry*, Vol. 5, pp. 683–699 (1962).) The referenced article describes materials of construction suitable for high pressure, oxygen-containing, acidic environments, some of which description is set forth below.

The reactor 11, in small sizes, is desirably made entirely of titanium metal, or is titanium-lined on all interior surfaces. Larger vessels may be fabricated of conventional steels, clad with type 316 stainless steel, and lined with lead protected by acid proof brick set with potassium base mortar. Compartment separations for larger vessels are constructed of carbon brick set with acid-proof cement (National Carbon C-6).

The agitators are desirably of welded titanium. Agitator shafts are likewise of titanium to the packing gland, with Carpenter 20 or similar alloys through the packing glands. Bearing surfaces are metallized with high chromium alloys, and all exposed parts are protected with a titanium shroud.

Heat exchangers and all pipe exposed to elevated temperatures are advantageously of titanium or titanium-clad steel. Valve surfaces are of alumina or of KT grade silicon carbide.

It has been found that the effectiveness of wet oxidation is governed, to a large extent, by the geometry of the reaction and agitator. The reactor vessel is advantageously a horizontally elongated pressure vessel divided into a plurality of compartments, with provisions for fluid flow from compartment to compartment in one direction along the reactor axis.

The proportions of each compartment are optimally right-circular, horizontal cylinders, whose length is approximately equal to their diameter. Centrally located in each compartment is an agitator positioned along a vertical axis perpendicular to the center line of the reactor, and centrally disposed with respect to each compartment. Tests have demonstrated that maximum efficiency is achieved with agitators which have two impellers, each with a diameter equal to about one-third of the chamber diameter; the lower impeller is positioned about one-third of the diameter above the bottom of the reactor, and the upper impeller two-thirds of the diameter. Each impeller consists of a disk with straight vertical vanes attached on the lower side, and extending along radii of the disk. The vanes extend vertically about 1/5 the diameter of the impeller.

The foregoing principles of reactor and agitator geometry have been extensively investigated and verified. (See Levine and Fassell, "Technique of Gas Oxidation During Pulp Agitation", *AIME Transactions* (*Mining*), Vol. 223 (1962).) While variations are permissible and may in some instances be desirable, this appears to represent the optimum design for most forseeable cases.

Impeller rotation rate for maximum utilization of power input varies somewhat with impeller diameter. In general, rates of from 1500 to 3000 rpm are desirable for impellers smaller than about four inches in diameter, while with larger impellers the optimum rate is apparently somewhat lower.

D. SLUDGE OXIDATION — PROCESS

As noted earlier, the process requires vigorous agitation of the waste-containing aqueous dispersion in a series of compartments, while an oxidizing gas is being continuously introduced into the dispersion in several (preferably all) of the compartments. The need for vigorous agitation has been demonstrated experimentally and its underlying theory is set forth below. While an understanding of the theoretical basis for these variables is unnecessary for practice of the invention, it does provide useful guidelines for varying the operating conditions to accommodate different waste feeds and to design suitable processing plants.

In substance, vigorous agitation beneficially effects several of the physical and mechanic aspects of the wet oxidation reaction. First, it intimately disperses the solid carbonaceous waste materials so that they are more accessible to the liquid and gaseous phases. Second, it disperses the air or other oxidizing gas through the aqueous medium as a myriad of fine bubbles to facilitate oxygen absorption and the evolution of gaseous oxidation products, mainly carbon dioxide. Other advantages are best perceived with reference to theories of mass transfer, as outlined below.

The overall wet oxidation reaction is in reality a combination of several chemical reactions which occur more or less simultaneously and at rates governed by a number of physical processes. These reactions are hydrolysis of solids, heterogeneous (solid-surface) oxidation, and homogeneous (liquid phase) oxidation. For the latter two, it is essential to provide an oxidizing medium in intimate contact with the oxidizable waste material.

For both homogeneous and heterogeneous oxidation, at least three sequential steps appear to be necessary. First, absorption of oxygen from the gas phase into the liquids; second, chemical reaction of the absorbed oxygen and the solid (heterogeneous) or soluble (homogeneous) waste material; and third, diffusion of gaseous oxidation products out into the gas phase. In the case of heterogeneous oxidation, the second step presumably requires the steps of oxygen transport to the solid surface, adsorption onto the solid surface, reaction (oxidation) at the surface, desorption of the oxidation products from the surface, and transport of the oxidation product into the bulk liquid phase.

The accepted mechanism of gas absorption into a liquid (and of gas desorption from the liquid to either a solid surface or the bulk gas phase) involves the two-film theory. Whitman, "The Two-Film Theory of Absorption", *Chem. and Met. Engr.*, Vol. 29, p. 147 (1923). In the case of gas absorption, gas molecules diffuse through a thin film of essentially stagnant fluid at the gas-liquid interface; the rate of transfer by diffusion is proportional to the concentration gradient across the film and to the available surface area, but is independent of agitation (since the film is essentially stagnant). Once the dissolved gas has diffused across the film, transfer through the bulk of the liquid is by convection currents, and concentration differences become negligible. Thus, mixing, which increases the rate of convection, accelerates the rate of gas transfer through the bulk of the liquid. A similar diffusion is presumed to exist when gas is desorbed, either onto a liquid-solid interface or onto a liquid-gas interface.

Mixing therefore significantly accelerates wet oxidation. It comminutes and distributes the solid waste materials. It disperses the oxygen-containing gas into the liquid as small bubbles, thus increasing the effective interfacial area for mass transfer. It also increases the rate of dissolved gas diffusion through the bulk liquid. Additionally, it circulates the liquid in swift eddy currents, delaying the escape of air bubbles from the liquid and thus increasing the contact time for mass transfer. Finally, it causes turbulent shear, thus reducing the thickness of the stagnant liquid film, and hence its resistance to mass transfer.

It has been suggested that one of the important reaction mechanisms in sewage sludge wet oxidation it is the hydrolysis of sludge solids to lower molecular weight species. To the extent that hydrolysis is significant, dispersion of the solids comminutes the solids and exposes larger surfaces to the hydrolizing effects of temperature, pressure, and acidity. Apparently the combined effect of agitation on promoting hydrolysis and on promoting oxidation in large parts accounts for the exceptionally rapid oxidation rate, and high oxidation efficiency, obtained by the present process.

Effecting the oxidation in a series of compartmented reaction zones, rather than in a single reaction zone, is advantageous from the standpoint of preventing both short-circuiting of solids (i.e. direct flow of an increment from the inlet to the outlet without sufficient residence time) and unnecessarily prolonged retention. In any single stage reactor in which the contents are agitated, it is not only possible but likely that all increments of the reactant fluids do not remain in the reaction zone for the same amount of time. As a result, some increments are under-converted while others are maintained in the zone for an excessive time. By employing a plurality of zones or compartments, in which the contents of each compartment are independently agitated and the reactant fluid flows from compartment to compartment, the likelihood of either short-circuiting or over-extensive retention is minimized. Further, the employment of a plurality of compartments permits the conditions to be optimized in each compartment; e.g. where catalysts are employed, it is advantageous to use the catalysts only in the final reaction stages.

E. SLUDGE OXIDATION — CONDITIONS

Conditions of temperature, pressure, time, air rate, and pH in the present invention are selected to optimize the reaction rate. While these variables are more or less interdependent, judicious selection of the several conditions leads to significantly enhanced oxidation efficiency.

The reaction temperature is unquestionably the major independent variable. In general, the higher the temperature the more rapid the oxidation reaction, all other factors being equal. However, should the temperature be unduly high, the total pressure must be increased disproportionately by reason of the vapor pressure of water increasing so rapidly with temperature. Concurrently, higher pressures require thicker and more expensive reactor vessels and, more importantly, greatly increase the cost of compressing air or other oxidizing gas. Conversely, should the temperature be unduly low, investment and operating costs are reduced but at the expense of a material reduction in oxidation efficiency.

Accordingly, it has been found and demonstrated that the average temperature prevailing in the reaction zone should be no lower than about 420°F and no higher than about 480°F, optimally within the range of about 440° to about 460°F. At these conditions, investment and operating costs are reasonable, while the oxidation efficiency is retained at a satisfactory level. It will be appreciated, of course, that the temperatures within each of the reactor compartments will differ by as much as 30° or 40° from the average, depending upon the amount of oxidation occurring within each of the compartments and on whether the individual compartments are provided with heat exchange tubes within or between the compartments. Thus, in a four-compartment reactor exemplified by the unit described in Example I, below, the first compartment may be at 470°–480°F, the second at 450°–455°F, the third at 430°–435°F, and the fourth at 415°–420°F.

The reactor pressure is determined by two factors; the vapor pressure of water at the highest temperature prevailing within the reactor, plus the selected partial pressure of oxygen, nitrogen, and other gases. Usually it is desirable to maintain a total pressure of between about 50 and 200 psig. above the vapor pressure of water at the highest temperature in the reactor, as this insures both a sufficiently high oxygen partial pressure to provide sufficient oxygen solubility in the liquid phase without unduly increasing the cost and complexity of equipment and operations. Where the oxidizing gas is commercially pure oxygen, the total system pressure to afford a particular oxygen solubility will necessarily be less than that of systems where the oxidizing gas is air.

The rate at which the air or other oxidizing gas is admitted into the reactant zone is governed by the quality (i.e. COD) of the waste material being treated, the quantity of such material (in volumes per unit time), and on the desired degree of oxidation. Ordinarily, the minimum oxidizing gas input rate is readily computed from the stoichiometric requirement of the oxidation; that is, the necessary quantity of oxygen needed to reduce the COD of the feed to a predetermined level. It has been found, however, that even with efficient agitation, the oxygen input should be from about 1.1 to about 2.0 times the theoretical quantity necessary to reduce the COD to zero.

In a reactor constructed according to the principles of the invention, there are usually from two to six reactor compartments. Ordinarily, the air or other oxidizing gas should be proportionated into each compartment so that each compartment receives an approximately equal fraction of the total oxidizing gas input. Experiments have been conducted in which the initial compartment or compartments receives a disproportionately higher amount of gas without deleterious effect.

Residence time in the reactor is the third major reaction zone variable. Tests on both sewage sludge and on various untreated wastes have indicated that, under normal conditions, a reactor residence time of between about 0.5 and about 1.0 hours is adequate for at least about 70% reduction in COD. Shorter times, down to as little as 0.2 hours, reduce the attainable effluent COD, while longer times, e.g. up to about 2.0 hours or even more, correspondingly decrease the effluent COD, but the relationship is not a proportional one.

Figure 4:
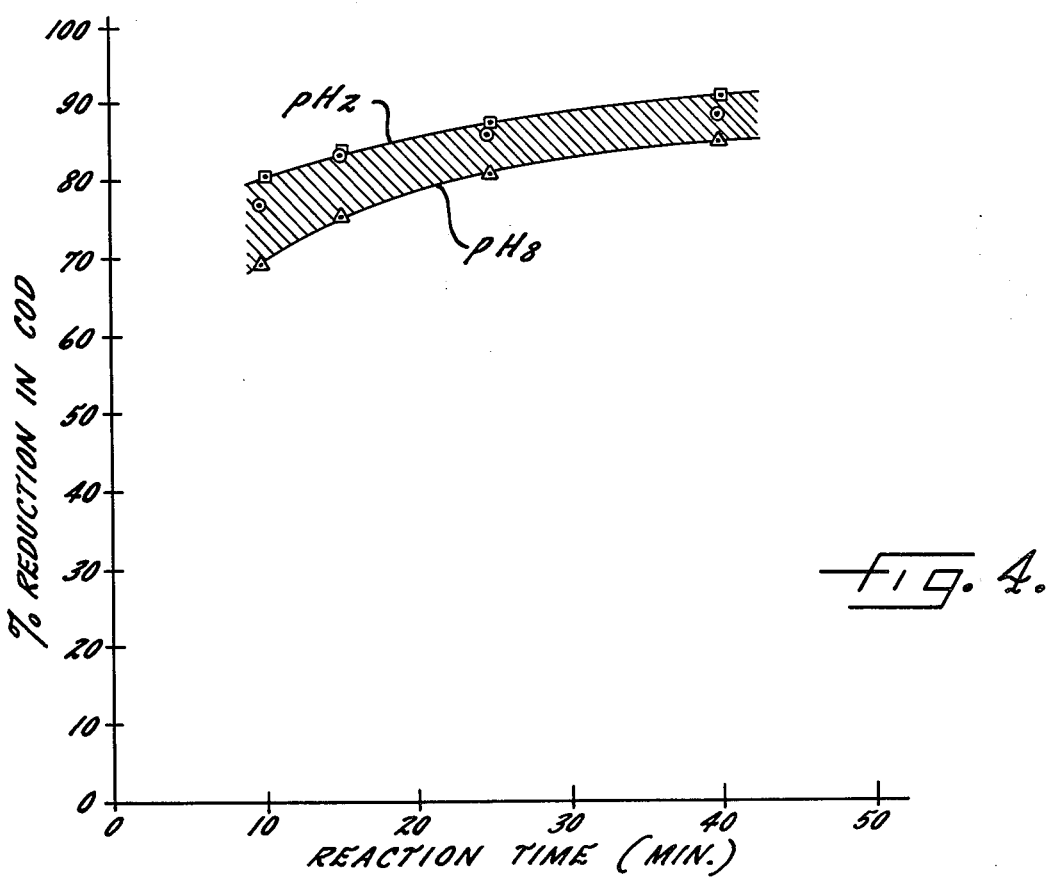
FIG. 4 is a chart showing the effect of pH on the wet oxidation of livestock waste in a single stage agitated reactor.
Figure 5:
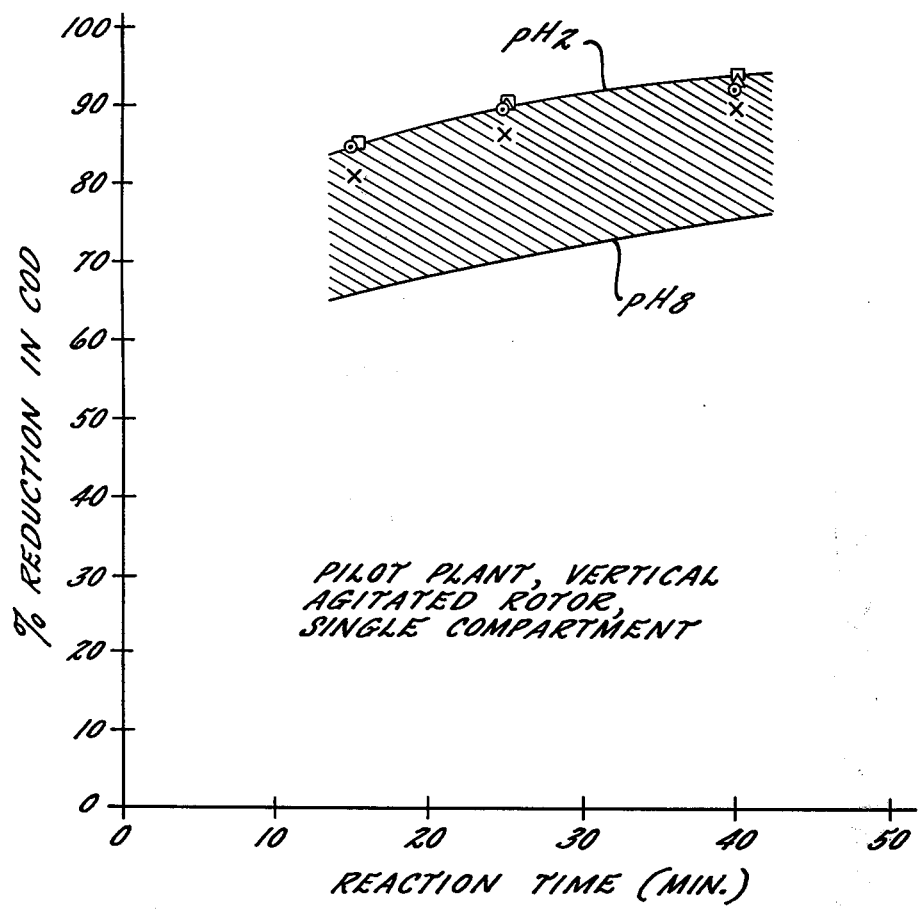
FIG. 5 is a graph illustrating the effect of pH on the wet oxidation of aircraft toilet wastewater, using a single stage agitated reactor.

It has been found that pH is a surprisingly potent variable in the system. This is rather surprising, since others have found that changing the pH from 5.5 to 9.9 has little or no observable effect on the oxidation rate. However, a pronounced acidic environment has been found to accelerate both the oxidation rate and the oxidation efficiency in a given reactor. In this regard, FIG. 3 should be referred to; increasing the acidity in the oxidation of sewage sludge from pH 8 to pH 2 can effect as much as ten percentage points additional reduction in COD. Similar results are observed with untreated wastes, e.g. livestock waste as shown in FIG. 4, and aircraft toilet wastewater in FIG. 5. Thus, for optimum practice of the invention, the pH should, on an average, be within the range of about 1.0 to about 5.0, preferably within the range of about 1.5 to about 4.0. Sulfuric acid is both a convenient and low cost acidifying agent, and does not contribute unduly to problems of processing or of maintaining an acceptable quality effluent.

F. SLUDGE OXIDATION — OPERATIONS

An exemplary plant for the practice of the instant process is schematically depicted in FIG. 1, and an illustrative reactor is shown, in sectioned perspective, in FIG. 2. Attention is invited to these figures.

Feed to the reactor 11 comprises a mixture of excess secondary (activated) sludge supplied from the secondary settling units 16 via a conduit 21, and primary sludge obtained from the primary sedimentation unit 14 via a conduit 19. Typically, the combined sludge contains from about 1 to about 10% by weight solids, of which approximately 20–50% is convertible to an ash, while the remainder is carbonaceous material.

The combined sludge stream is pumped via a positive displacement piston pump 20 through the conduit 21 to a heat exchanger 22 before introduction to the reactor 11. Although the heat exchanger 22 of FIG. 1 is shown as effecting simple heat exchange with the reactor 11 effluent discharged via a conduit 24, in larger plants particularly it may be desirable to include a plurality of heat exchangers, either to increase the temperature of the influent stream or to recover additional heat from the effluent stream, or both.

In any event, the preheated influent from the heat exchanger 22 is conducted via a conduit 23 to the reactor 11. Just before introduction of the influent, sulfuric acid is metered in from a source 25 to insure that the reactor 11 contents are maintained in an acid condition. Sulfuric acid is employed for this purpose, as it is not excessively corrosive, does not unnecessarily contaminate the effluent, and is relatively stable under oxidizing conditions.

The reactor 11 is operated at an initial temperature, i.e., temperature in the first reaction compartment, of about 460°F; the influent temperature is somewhat lower, e.g., about 420°–440°F, and is increased through the exothermic heat of the oxidation reaction. The corresponding pressure in the reactor 11 is about 575–650 psig.

The reactor 11 is divided into five compartments, the first four being essentially right cylinders of a length approximately equal to their diameters. Baffles 26 composed of titanium extend about ¾ the distance to the top of the reactor, and are provided with central notches 28 to serve as weirs and allow essentially one-way flow from compartment to compartment through the reactor. The last compartment in the chain of series is employed as a disengaging zone, to permit separation of the vaporous effluent, discharged through a conduit 29, and a liquid effluent 24 which is discharged to the environment.

Each of the first four compartments is provided with a vertical agitator 30 equipped with a pair of discs 31 and with a hollow shaft 32 for introduction of compressed air or oxygen-enriched air. Each disc 31 has radially extending rectangular vanes on the bottom surface, a design found optimal in dispersing a gas into a liquid at elevated pressure. The agitators 30 are centrally located in each compartment, and are separately driven by a battery of electrical motors 34.

Air is introduced into the reactor 11 via the hollow conduits 32 which comprise the agitator shafts. The conduits 32 are supplied from a common header 35, into which compressed air is admitted from a compressor 36 at about 750 psig. The air is thus introduced into each compartment below the lower turbine disc and near the bottom of the compartment. Vigorous agitation by the agitators 30 in each compartment disperses the air throughout the liquid in each individual compartment, thereby effecting oxidation of the waste materials.

Careful experiments on a batch scale have established that the oxidation reaction proceeds in two apparently-interconnected rate-limiting steps, each of which is pseudo-first-order with respect to the COD content of the liquid phase, and rate-determining over a range of percentage reduction in COD. For example, a plot of the logarithm of effluent concentration versus reaction time gives two intersecting straight lines, the latter with a substantially diminished slope compared to the former.

Oxidation is relatively rapid until about two thirds of the original COD organics have been oxidized, and then continues at approximately one tenth the rate for the remainder. Thus, most of the oxidation occurs in the initial compartment or compartments.

It has also been found that the oxidation reaction, qualitatively speaking, proceeds step-wise through a series of reaction intermediates. Presumably, the waste materials are hydrolyzed and/or oxidized from their initial complex structures to simpler, lower molecular weight, compounds such as the lower fatty acids, e.g. acetic acid. This step occurs relatively rapidly. The next step, oxidation of these intermediates to the end products, namely carbon dioxide and water, proceeds at a slower rate. Indeed, there is evidence that much of the residual COD is actually represented by relatively simple chemical compounds, e.g. acetic and formic acid.

These latter compounds are volatile, and tend to pass into the gas phase along with steam and uncondensable gases, e.g. nitrogen, carbon dioxide, and unused oxygen. These gases are discharged from the reactor 11 via a gas discharge conduit 29 for ultimate exhaustion to the atmosphere.

Gases exiting through the conduit 29 may, if desired, be conducted to a heat exchanger 38 and/or a pressure recovery turbine 39. The heat exchanger 38 recovers heat, and may be associated with the initial feed heat exchanger 22; the pressure recovery turbine may be used, for example, to power an initial stage of the air compressor 20.

The exhaust gases from the reactor 11, whether or not subjected to heat exchange and pressure recovery, are conveniently scrubbed in a scrubbing tower 40, using treated water effluent (from the conduit 18) or the like admitted via an upper conduit 41. The water scrubs out fatty acids and other unconverted partially oxidized components, which are then recycled via the conduit 42 to the primary sedimentation unit 14.

Liquid withdrawn via conduit 24 from the final compartment of the reactor 11 is returned to the feed heat exchanger 22 and then, via a pressure control valve 45, to a storage tank 46. Gases are vented through a tank vent line 48, while the treated liquid effluent is withdrawn from a lower draw-off conduit 49.

The treated liquid effluent from the conduit 49 is biologically sterile and, in normal optimum plant operation, has a COD of substantially less than 30% of the initial COD of the feed entering the reactor 11. In many instances its COD is less than 10% of the initial COD. As such, the feed is suitable for discharge to the environment where local laws permit. Alternatively, it may be recycled to the primary sedimentation unit 14 for removal of suspended ash particles and any residual COD constituents, again depending on the requirements of local laws.

G. ADVANTAGES

In terms of purification, the instant process is comparable or superior to the best of preexisting wet oxidation processes.

FIG. 3 presents, on the basis of reduction in chemical oxygen demand at different reaction times, a comparison of reported commercial data on a vertical, non-agitated, wet oxidation system, with data obtained from a pilot plant agitated reactor, using a single compartment to simulate the first compartment of a multi-compartmented reactor of the present invention. The data should not be taken as being quantitatively comparable, as, among other factors, differences in equipment size, in feedstocks, and in possibly other variables are quite significant.

Nonetheless, the data of FIG. 3 indicate, at least qualitatively, that intensive agitation at moderate temperatures is more effective, at equal time, than non-agitated reactors at substantially higher temperatures. The significance in terms of both investment and operating costs are manifest.

EXAMPLE I

This Example illustrates the wet oxidation of a simulated shipboard waste, using a multiple-stage compartmented reactor. This waste material differs in many respects from sewage sludge, particularly in the fact that it has not been subjected to any pretreatment such as aerobic microbial digestion.

The reactor was a horizontally elongated cylinder vessel, 10 inches internal diameter by 42 inches internal length, lined with carbon. Three baffles of titanium, extending 9½ to 9 inches vertically upward from the bottom of the vessel, divided the vessel into four equal-sized compartments; the material to be treated entered the first of the compartments via an inlet conduit near the top of the center line of the vessel and, after treatment, was discharged from the last compartment through an outlet conduit slightly above the center line.

A dual turbine agitator extended vertically downward into the center of each compartment. The turbine blades, made of titanium, were 3 inch diameter discs with a series of eight rectangular blades, each ⅜ by ¾ inch, along evenly spaced radii at the underside of each disc. The lower disc was located approximately one third up from the bottom of the vessel, and the upper disc approximately two thirds. The turbine shaft was hollow to permit introduction of air into each compartment at the underside of the lower turbine blades.

The autoclave was fed by a blow-case pump system which injected one liter of wastewater into the first compartment during the twentysecond injection period of an approximately two-minute pumping cycle. A heat exchanger was provided to insure proper feed pretreatment temperature.

Unless otherwise stated, 6 g/l of sulfuric acid was added to the sludge or wastewater before its injection into the autoclave reactor. (In subsequent tests, the pH of effluent samples was estimated by indicator papers; in some runs, the acidity of the final effluent was determined by chemical analysis.)

Wastewater feed was prepared in 35–40 gallon batches by macerating the daily waste of one person and diluting it to 35 gallons, the established per-capita-day volume of combined shipboard wastewaters. Typical makeup of the daily waste is indicated in the table below:

COMPOSITION OF INFLUENT

Table Scraps

Shells from two eggs.
Grease from frying two eggs.
Coffee grounds from percolating six cups.
Trimmings from one steak.
Remains from one salad.
Remains from one serving of beef and noodles.
Peels from one orange.
One-third slice of bread.

Toiletries

Shaving cream from one shave.
Toothpaste from one brushing.

Body Waste

Feces from one individual, collected over a 24-hour period. (Est. 100–150 gm.)
Urine, 1 quart.

Municipal Water

Thirty-five gallons.

For each run, feed was introduced and the reactor maintained in continuous use for two hours before any sampling in order to establish equilibrium conditions. Samples were taken of the feed, of the liquid contents of each compartmment, and of the combined vapor condensate, at approximately hourly intervals. In this test, the vapor-phase condensate represented approximately 5%, by volume, of the influent mass, and was primarily water with residual organic matter, chiefly acetic acid and other partially oxidized products.

Operating conditions for Test 1 were as follows:

Summary of Operating Conditions: Test 1

| | |
|---|---|
| Reactor Temperature | |
| Compartment 1 | 470 – 480°F |
| Compartment 2 | 460 – 465°F |
| Compartment 3 | 440 – 450°F |
| Compartment 4 | 420 – 440°F |
| Reactor Pressure | 600 psi, max. |
| Steam | 550 psi, max. |
| Air Flow | 4.8 cfm |
| Pumping Rate | 0.433 l/min |
| Residence Time, Average | 15 min./ compartment |
| Speed of Agitators | 800 rpm |

Analysis of the streams was for chemical oxygen demand (COD), in accordance with the procedure of "Standard Methods for the Examination of Water and Wastewaters", 13th Edition.

Results of the test were as follows:

Results of Chemical Analysis: Test 1

| Sampling Time | Sample Station | COD, mg/l | Percent Reduction in COD |
|---|---|---|---|
| 0100 | Influent | 1975 | — |
| | Compartment 1 | 945 | 52.2 |
| | Compartment 2 | 626 | 68.3 |
| | Compartment 3 | 586 | 70.3 |
| | Compartment 4 | 529 | 73.2 |
| 0200 | Influent | 1715 | — |
| | Compartment 1 | 850 | 50.4 |
| | Compartment 2 | 559 | 67.4 |
| | Compartment 3 | 508 | 70.4 |
| | Compartment 4 | 407 | 76.3 |
| 0245 | Influent | 1809 | — |
| | Compartment 1 | 692,670 | 61.7 |
| | Compartment 2 | 551 | 69.5 |
| | Compartment 3 | 483 | 73.3 |
| | Compartment 4 | 393 | 78.3 |

EXAMPLE II

In this Example, the apparatus used in Example I was employed to establish the effectiveness of the process in the treatment of a simulated shipboard waste under conditions of varying salinity.

The equipment was modified by mounting on the vessel walls within each reactor compartment approximately 15–20 square inches of a carbonaceous surface catalyst, specifically carbon felt.

Except as otherwise stated, all other process conditions were the same as those for Example I. The feed, however, consisted of macerated feces and urine in tap water, containing about 6 g/l $H_2SO_4$.

Summary of Operating Conditions: Test 2

| | |
|---|---|
| Reactor Temperature | |
| Compartment 1 | 470 – 480°F |
| Compartment 2 | 450 – 455°F |
| Compartment 3 | 430 – 435°F |
| Compartment 4 | 415 – 420°F |
| Reactor Pressure | |
| Total | 600 psi max. |
| Steam | 550 psi max. |
| Air Flow | 4 – 6 cfm |
| Pct. supplied to Compartment 1: | 33 |
| Pct. supplied to Compartment 2: | 27 |
| Pct. supplied to Compartment 3: | 20 |
| Pct. supplied to Compartment 4: | 20 |
| Speed of Agitators | 800 rpm |
| Pumping Rate | 0.4–0.5 l/min. |
| Residence Time | 14 min/ compartment |

A material balance demonstrated the following:

| | |
|---|---|
| Volume of influent treated, l | 200 |
| Volume of vapor condensate collected, l | 11.7 |
| Pct. of influent volume condensed from vapor | 5.85 |
| Pct. of influent COD condensed from vapor | 4 |

In view of the relatively high air flow in this and other tests of Example II, the amount of vapor condensate is higher than would be expected for normal operation.

Results of Chemical Analysis: Test 2

| Sampling Time | Sample Station | COD, mg/l | % Red. in COD | Solute Concentration, mg/l | | | |
|---|---|---|---|---|---|---|---|
| | | | | $H_2SO_4$ | Cl* | Amm. N | pH |
| 1300 | Influent | 2386 | | 6000 | 420 | | |
| | Comp. 1 | 495 | 79.3 | | 387 | | |
| | Comp. 2 | 421 | 82.4 | | 318 | | |
| | Comp. 3 | 339 | 85.8 | | | | |
| | Comp. 4 | 266 | 88.9 | | | | |
| | Vapor Cond. | 1175 | | | 17 | | |
| 1400 | Influent | 2222 | | 6000 | | | |
| | Comp. 1 | 479 | 78.4 | | | | |
| | Comp. 2 | 414 | 81.4 | | | | |
| | Comp. 3 | 344 | 84.5 | | | | |
| | Comp. 4 | 255 | 88.5 | | | | |
| | Vapor Cond. | 1794 | | | | | |
| 1530 | Influent | 2036 | | 6000(?) | | | 1.42 |
| | Comp. 1 | 473 | 76.8 | | | 338 | 1.47 |
| | Comp. 2 | 402 | 80.3 | | | 351 | 1.45 |
| | Comp. 3 | 371 | 81.8 | | | | |
| | Comp. 4 | 307 | 84.9 | | | | |
| | Vapor Cond. | 1336 | | | | | 3.07 |
| 1630 | Influent | 1655 | | 6000(?) | | | |
| | Comp. 1 | 385 | 76.7 | | | | |
| | Comp. 2 | 365 | 78.0 | | | | |
| | Comp. 3 | 338 | 79.6 | | | | |
| | Comp. 4 | 300 | 81.9 | | | | |
| | Vapor Cond. | 1191 | | | | | |

*Assay of composited hourly samples.

For the next test, the original mixture of macerated feces and urine was diluted in a mixture of one part sea water and two parts tap water so as to simulate a shipboard waste from ships utilizing sea water to flush toilets. The same conditions were employed as for Test 2. A material balance showed the following:

| | |
|---|---|
| Volume of Influent Treated, l | 122 |
| Volume of Vapor Condensate Collected, l | 6 |
| Pct. of influent volume condensed from vapor | 4.9 |
| Pct. of influent COD condensed from vapor | 5.3 |

Results of this test were as follows:

Results of Chemical Analysis: Test 3

| Sample Time | Sample Station | COD, mg/l | % Red. in COD | Solute Concentration, mg/l | | | |
|---|---|---|---|---|---|---|---|
| | | | | $H_2SO_4$ | Cl* | Amm. N | pH |
| 1300 | Influent | 1780 | | 6000 | 6992 | | |
| | Comp. 1 | 769 | 56.8 | | 6071 | | |
| | Comp. 2 | 730 | 59.0 | | 5924 | | |
| | Comp. 3 | 708 | 60.0 | | 5764 | | |
| | Comp. 4 | 685 | 61.5 | | 5719 | | |
| | Vapor Cond. | 1833 | | | 52 | | 2.94 |
| 1430 | Influent | 1796 | | 6000 | | | |
| | Comp. 1 | 639 | 64.4 | | | 265 | 1.48 |
| | Comp. 2 | 615 | 65.8 | | | 262 | 1.48 |
| | Comp. 3 | 564 | 68.6 | | | 260 | 1.48 |
| | Comp. 4 | 544 | 69.7 | | | 256 | 1.48 |
| | Vapor | 2014 | | | | | |

-continued
Results of Chemical Analysis: Test 3

| Sample Time | Sample Station | COD, mg/l | % Red. in COD | Solute Concentration, mg/l H₂SO₄ | Cl* | Amm. N | pH |
|---|---|---|---|---|---|---|---|
| | Cond. | | | | | | |

*Assay of Composited Hourly Samples.

For the next test in the series, identified as Test 4, the dilution was one part sea water and five parts tap water. All other process conditions remained the same.

| A material balance showed the following: | |
|---|---|
| Volume of influent treated, l | 132 |
| Volume of vapor condensate collected, l | 11.6 |
| Pct. of influent volume condensed from vapor | 8.8 |
| Pct. of influent COD condensed from vapor | 8.2 |
| A material balance showed the following: | |
| Volume of Influent Treated, l | 184 |
| Volume of Vapor Condensate Collected, l | 12.3 |
| Pct. of Influent Volume Condensed from Vapor | 6.7 |
| Pct. of Influent COD Condensed from Vapor | 7.0 |

Results of this test were as follows:

Results of Chemical Analysis: Test 4

| Sample Time | Sample Station | COD, mg/l | % Red. in COD | H₂SO₄ | Cl* | Amm. N | pH |
|---|---|---|---|---|---|---|---|
| 0100 | Influent | 1609 | | 6000 | 3388 | | |
| | Comp. 1 | 540 | 66.4 | | 3127 | | |
| | Comp. 2 | 498 | 69.0 | | 3024 | | |
| | Comp. 3 | 471 | 70.7 | | 2922 | | |
| | Comp. 4 | 442 | 72.5 | | 2444 | | |
| | Vapor Cond. | 1645 | | | 46 | | |
| 0200 | Influent | 1700 | | 6000 | | | 1.40 |
| | Comp. 1 | 629 | 63.0 | | | 211 | 1.43 |
| | Comp. 2 | 533 | 68.6 | | | 200 | 1.44 |
| | Comp. 3 | 482 | 71.6 | | | 217 | 1.45 |
| | Comp. 4 | 442 | 74.0 | | | 212 | 1.45 |
| | Vapor Cond. | 1855 | | | | | 2.85 |
| 0330 | Influent | 1292 | | 6000 | | | |
| | Comp. 1 | 470 | 63.6 | | | | |
| | Comp. 2 | 410 | 68.3 | | | | |
| | Comp. 3 | 369 | 71.4 | | | | |
| | Comp. 4 | 349 | 73.0 | | | | |
| | Vapor Cond. | 1083 | | | | | |
| 0430 | Influent | 1276 | | 6000 | | | |
| | Comp. 1 | 482 | 62.2 | | | | |
| | Comp. 2 | 441 | 65.4 | | | | |
| | Comp. 3 | 392 | 69.3 | | | | |
| | Comp. 4 | 324 | 74.6 | | | | |
| | Vapor Cond. | 1620 | | | | | |

EXAMPLE III

In this Example, the apparatus of Example I was used to demonstrate the effectiveness of the process in treating a primary sewage sludge.

The following conditions were employed:

Summary of Operating Conditions, Test 3

| Reactor Temperature | |
|---|---|
| Compartment 1 | 470–480°F |
| Compartment 2 | 460–470 |
| Compartment 3 | 450–460 |
| Compartment 4 | 430–450 |
| Reactor Pressure | |
| Total | 600 psi max. |
| Steam | 550 psi max. |
| Air Flow | 4 cfm |
| Pct. supplied to Compartment 1: | 33 |

-continued
Summary of Operating Conditions, Test 3

| | |
|---|---|
| Pct. supplied to Compartment 2: | 27 |
| Pct. supplied to Compartment 3: | 20 |
| Pct. supplied to Compartment 4: | 20 |
| Speed of Agitators | 800–900 rpm |
| Residence Time | 64 min. total |

The primary sewage sludge was acidified with 6 g/l $H_2SO_4$.

An analysis of the compositions in the various compartments revealed the following:

| | C.O.D. | % C.O.D. Reduction |
|---|---|---|
| Inlet | 40,900 mg/l 0 | — |
| Compartment 1 | 17,300 | 57.3 |
| Compartment 2 | 9,000 | 78 |
| Compartment 3 | 7,400 | 82 |
| Compartment 4 | 6,400 | 84.4 |
| Effluent | 6,500 | 84.4 |

Thus it is apparent that there has been provided, according to the invention, an outstandingly effective process for the wet oxidation of sewage sludge and other carbonaceous residues. An unusually high degree of oxidation is obtained at moderate conditions of temperature and pressure, with the result that a clean effluent is produces with relatively low cost of equipment and utilities.

We claim:

1. In a process for the wet oxidation of carbonaceous waste materials, wherein an aqueous dispersion of said materials is contacted with an oxidizing gas at sufficient time, temperature, and pressure to effect substantial oxidation of said materials, the improvement characterized by:
   a. effecting said contact and said oxidation in a horizontally-elongated reactor vessel divided into a plurality of generally cylindrical interconnecting compartments,
   b. continuously introducing said aqueous dispersion of waste materials near one end of said reactor vessel, flowing said dispersion from compartment to compartment through said vessel, and withdrawing oxidized dispersion from near the opposite end of said vessel,
   c. maintaining the pH of said dispersion in the acid range,
   d. continuously introducing said oxidizing gas into said dispersion in a plurality of said compartments, and
   e. vigorously agitating the dispersion in said plurality of compartments to disperse oxidizing gas therethrough, and thereby effect oxidation of said waste materials to produce an ecologically acceptable effluent.

2. Process of claim 1 wherein said pH is within the range of about 1.5 to about 4.0.

3. Process of claim 1 wherein said waste materials are sewage sludge.

4. Process of claim 1 wherein said generally cylindrical compartments have a length approximately equal to their diameter.

5. Process of claim 1 wherein the average temperature of said dispersion in said reactor vessel is within the range of about 420° to about 480°F.

6. Process of claim 1 wherein said agitation is effected with vertically aligned vane impellers.

* * * * *